(12) United States Patent
Ishikawa

(10) Patent No.: US 6,330,075 B1
(45) Date of Patent: *Dec. 11, 2001

(54) IMAGE PROCESSING METHOD AND APPARATUS

(75) Inventor: Hisashi Ishikawa, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/687,954

(22) Filed: Jul. 26, 1996

(30) Foreign Application Priority Data

Aug. 3, 1995 (JP) .................................. 7-198480

(51) Int. Cl.[7] ............................... G06F 15/00; G06F 3/08
(52) U.S. Cl. .......................... 358/1.9; 358/523; 358/518
(58) Field of Search .................................. 358/539, 534, 358/500, 523, 518, 519, 520, 456, 455; 382/252, 451

(56) References Cited

U.S. PATENT DOCUMENTS

| | | | |
|---|---|---|---|
| 4,683,492 | * 7/1987 | Sugiura et al. .................... | 358/518 |
| 5,070,413 | 12/1991 | Sullivan et al. ................... | 358/456 |
| 5,270,808 | 12/1993 | Tanioka ............................. | 358/527 |
| 5,463,479 | * 10/1995 | Kuga .................................. | 358/518 |
| 5,621,545 | * 4/1997 | Motta et al. ....................... | 358/518 |
| 5,659,406 | * 8/1997 | Imao et al. ........................ | 358/518 |
| 5,739,917 | * 4/1998 | Shu et al. .......................... | 382/252 |
| 5,742,405 | * 4/1998 | Spaulding et al. ................. | 358/534 |
| 5,748,336 | * 5/1998 | Kakutani ........................... | 382/252 |
| 5,748,772 | * 5/1998 | Moro et al. ........................ | 382/252 |
| 5,748,785 | * 5/1998 | Mantell et al. .................... | 382/252 |

* cited by examiner

Primary Examiner—Cheukfan Lee
(74) Attorney, Agent, or Firm—Fitzpatrick, Cella, Harper & Scinto

(57) ABSTRACT

An output dot pattern is generated directly from input pixel data using a LUT obtained by partitioning input color space into a predetermined number of zones and mapping an output dot pattern for each zone of partitioned space, the output dot pattern is converted to input color space using a LUT that converts a color reproduced by the output dot pattern to input color space, the difference (error) with respect to the input pixel data is obtained, and the difference value is diffused to the surrounding pixels. As a result, color reproduction and binarization processing can be executed by a search of the two LUTs and error-diffusion processing performed a single time.

12 Claims, 16 Drawing Sheets

| CYAN | MAGENTA | YELLOW | CODE |
|------|---------|--------|------|
| 0000 | 0000 | 0000 | 0 |
| 0000 | 0000 | 0001 | 0 |
| 0000 | 0000 | 0010 | 1 |
| ⋮ | ⋮ | ⋮ | ⋮ |
| 1000 | 0000 | 0000 | 127 |
| 1000 | 0000 | 0001 | 115 |
| 1000 | 0000 | 0000 | 116 |
| ⋮ | ⋮ | ⋮ | ⋮ |
| 1111 | 1111 | 1101 | 255 |
| 1111 | 1111 | 1110 | 255 |
| 1111 | 1111 | 1111 | 255 |

| CODE | CYAN | MAGENTA | YELLOW |
|------|------|---------|--------|
| 0    | 0    | 0       | 0      |
| 1    | 0    | 0       | 41     |
| 2    | 0    | 0       | 85     |
| ⋮    | ⋮    | ⋮       | ⋮      |
| 127  | 131  | 48      | 11     |
| 128  | 129  | 41      | 91     |
| 129  | 131  | 45      | 149    |
| ⋮    | ⋮    | ⋮       | ⋮      |
| 253  | 226  | 255     | 129    |
| 254  | 239  | 255     | 188    |
| 255  | 255  | 255     | 255    |

IMAGE PROCESSING METHOD AND APPARATUS

BACKGROUND OF THE INVENTION

This invention relates to an image processing method and apparatus. More particularly, the invention relates to color reproduction processing of a color printer.

An image processing method based upon a color dot model is well known as an image processing method using a color printer.

FIG. 20 is a block diagram illustrating the architecture of an image processor in a color printer according to the prior art. The luminance signals of R, G, B entered from an input terminal 101 are each converted to density signals of C, M, Y by a density converter 102. A black density signal K is produced by a black generator 103 from the density signals resulting from the conversion, and a dot area signal subjected to undercolor removal and compensated for crosstalk components of the density signals by a masking/UCR unit 104 is obtained. Linearity between the dot area signal and output density based upon dot gain is corrected by an output gamma corrector 105, each color component is binarized by a binarizing unit 106, and the resulting dot patterns are outputted to a printer engine (not shown) from an output terminal 107.

The density converter 102 and output gamma corrector 105 usually are constituted by a look-up table (hereinafter referred to as a "LUT").

In the example of the prior art described above, binarization processing is executed for each of the C, M, Y, K planes. Consequently, the overlapping of the C, M, Y, K dots is random, it is very difficult to achieve conformity of color reproduction by masking and difficult to limit the number of dots on dots.

Further, since density conversion, black generation, masking/UCR, output gamma correction and binarization processing are executed independently of one another, processing takes time or a large amount of hardware (calculations) is required.

The specifications of U.S. Pat. Nos. 5,070,413 and 5,270,808 describe technology for converting input color image data to output color image data in three-dimensional color space. The disclosed technology obtains 1-bit output data for each of Y, M, C, K from 8-bit input data for each of R, G, B. According to this approach, in order to determine which output color, among 16 output colors represented by one bit for each of Y, M, C, K, the input data represented by eight bits for each of R, G, B in three-dimensional color space is nearest to, 16 distances between the input data and the output colors are obtained and the output color for which the distance is smallest is decided upon as being the output color.

In this case, processing takes time. Accordingly, there is a need for high-speed processing and processing for providing higher image quality.

SUMMARY OF THE INVENTION

Accordingly, an object of the present invention is to provide an image processing method and apparatus through which high-speed processing and a high-quality color image can be obtained.

Another object of the present invention is to provide an image processing method and apparatus through which each of a plurality of input color-component data is converted to data having a level lower than the input level, a table is accessed by data the amount of which has been reduced and a plurality of output color-component data are generated, thereby making it possible to obtain a high-quality color image simply and at high speed.

According to the present invention, the foregoing objects are attained by providing an image processing method comprising an input step of entering data of a plurality of color components in input color space, a quantization step of quantizing the data of each of the plurality of color components to data having a level lower than an input level, a generation step of generating data of a plurality of output color components, by a table conversion, from the quantized data of the plurality of color components, a step of obtaining color reproduction error between input color data and output color data by converting colors, which are expressed by the data of the plurality of output color components, to data in the input color space, and a first error correction step of correcting the color reproduction error obtained.

Further, according to the present invention, the foregoing objects are attained by providing an image processing apparatus comprising input means for entering data of a plurality of color components in input color space, quantizing means for quantizing the data of each of the plurality of color components to data having a level lower than an input level, generating means for generating data of a plurality of output color components, by a table conversion, from the quantized data of the plurality of color components, means for obtaining color reproduction error between the input color data and output color data by converting colors, which are expressed by the data of the plurality of output color components, to data in input color space, and first error correction means correcting the color reproduction error obtained.

A further object of the present invention is to provide an image processing method and apparatus for generating a plurality of output color-component dot patterns from a plurality of input color-component data, thereby making it possible to obtain, simply and at high speed, a high-quality color image having a resolution higher than the input resolution.

According to the present invention, the foregoing object is attained by providing an image processing method comprising an input step of entering data of a plurality of input color components in input color space, a generation step of generating dot patterns of a plurality of output color components, by a table conversion, based upon the data of the plurality of input color components, a step of obtaining color reproduction error between input color data and output color data by converting colors, which are expressed by the dot patterns of the plurality of output color components, to data in the input color space, and a first error correction step of correcting the color reproduction error obtained.

Further, according to the present invention, the foregoing object is attained by providing an image processing apparatus comprising input means for entering data of a plurality of input color components in input color space, generating means for generating dot patterns of a plurality of output color components, by a table conversion, based upon the data of the plurality of input color components, means for obtaining color reproduction error between input color data and output color data by converting colors, which are expressed by the dot patterns of the plurality of output color components, to data in the input color space, and first error correction means for correcting the color reproduction error obtained.

Yet another object of the present invention is to provide an image processing method and apparatus for generating an output dot pattern directly from input pixel data using a LUT obtained by partitioning input color space into a predetermined number of zones and mapping an output dot pattern for each zone of partitioned space, converting the output dot pattern to input color space using a LUT that converts a color reproduced by the output dot pattern to input color space, obtaining the difference (error) with respect to the input pixel data, and diffusing the difference value to neighboring pixels, whereby color reproduction and binarization processing are executed by a search of the two LUTs and a single error-diffusion processing step to obtain, in simple fashion, an image output exhibiting good color reproduction, wherein the number of dot-on-dot mixed colors of C, M, Y, K is strictly limited owing to the fact that the CMYK dot pattern is mapped.

A further object of the present invention is to provide an image processing method and apparatus in which processing for diffusing error due to density conversion and quantization is executed in RGB luminance space and color-reproduction error-diffusion processing is executed in output density space, whereby error diffusion is performed in the ideal space, in which an image output exhibiting even better color reproduction is obtained by correcting an error resulting from density conversion, and in which color-reproduction error-diffusion processing is executed in quantized density space, thereby making it possible to reduce the amount of hardware.

Another object of the present invention is to provide an image processing method and apparatus in which a scan conversion is executed between processing for diffusing an error produced at the time of density conversion and partitioning of color space and processing for diffusing color-reproduction error, as a result of which the scanning direction of each error diffusion is reversed to improve upon phase distortion caused by error diffusion.

Another object of the present invention is to provide an image processing method and apparatus in which one pixel is expressed by N dots (where N is an integer of two or greater), as a result of which enlargement processing is dispensed with when an image is enlarged by a factor of N (area), and in which one color is expressed by N dots so that the effects of peripheral dot overlap are diminished in comparison with expression by one dot, whereby the precision of reproduced color data is improved as well as color reproducibility.

Another object of the present invention is to provide an image processing method and apparatus in which processing is provided for correcting a shift in reproduced color due to overlap at the boundary of a pixel of interest and neighboring pixels, as a result of which the accuracy of color-reproduction error is improved as well as color reproducibility.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Embodiments of the present invention will now be described in detail with reference to the accompanying drawings.

[First Embodiment]

Figure 1:
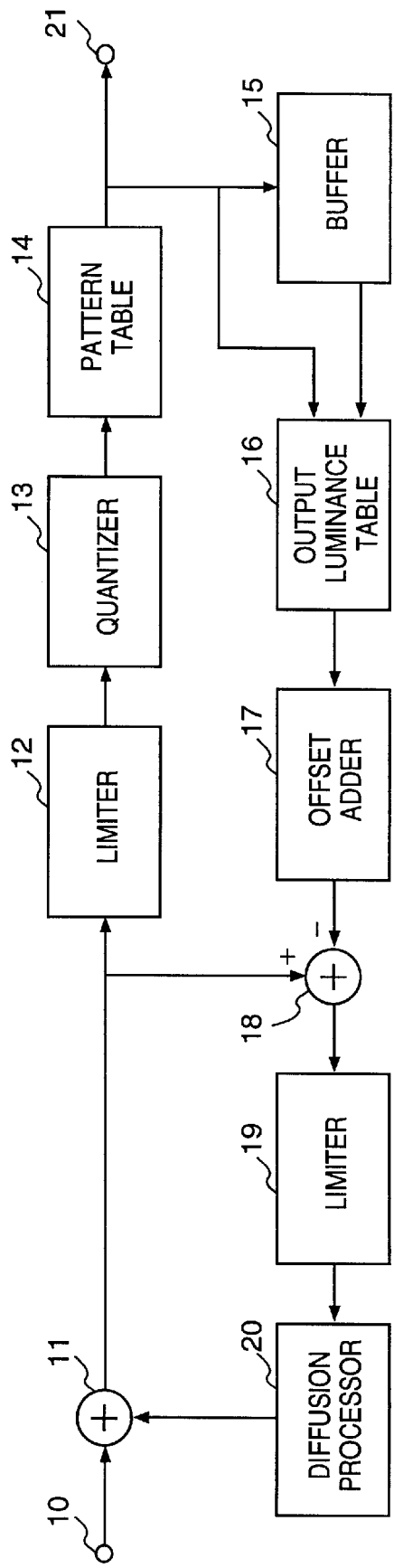
FIG. 1 is a block diagram illustrating the architecture of an image processor according to a first embodiment of the present invention.

FIG. 1 is a block diagram illustrating the architecture of an image processor according to a first embodiment of the present invention. The image processor has an input terminal 10, an adder 11, a limiter 12, a quantizer 13, a pattern table 14, a buffer 15, an output luminance table 16, an offset adder 17, a subtractor 18, a limiter 19, a diffusion processor 20 and an output terminal 21.

The luminance signals of RGB entered from the input terminal 10 are applied to an adder 11, which sums these with an error signal from the diffusion processor 20, described later, on a signal-by-signal basis. The output of the adder 11 enters the limiter 12 and subtractor 18. The limiter 12 limits the output of the adder 11 to the range in which the input RGB luminance signals reside and outputs the result to the quantizer 13. The quantizer 13 is for reducing the number of input bits to the pattern table 14. For example, nine bits for each of R, G, B are quantized to three bits for each of R, G, B.

A dot pattern for which the number of mixed colors has been limited is mapped in the pattern table 14 in advance. When the quantized RGB luminance signals enter the pattern table 14, C, M, Y, K dot patterns are outputted to the buffer 15 and output luminance table 16 and to a printer engine (not shown) from the output terminal 21. For example, if the maximum number of mixed colors (the maximum value of number of colors for which there is dot-on-dot overlap) is two, "1" represents an on dot and "0" represents an off dot, patterns of the 11 colors CMYK=(1100), (1010), (1001), (0110), (0101), (0011), (1000), (0100), (0010), (0001), (0000)

are mapped in quantized RGB space of the pattern table 14. One color among these 11 colors is selected and outputted in accordance with the entered RGB luminance signals.

The buffer 15 outputs the dot patterns of pixels spatially neighboring a pixel of interest to the output density table 16. The reproduced color of a pixel of interest which takes into account the effects of neighboring pixel overlap is calculated in the form of RGB luminance signals. The values obtained are stored in the output density table 16 in advance. When the dot pattern of the pixel of interest and the dot patterns of pixels neighboring the pixel of interest enter the output density table 16 from the pattern table 14 and buffer 15, the calculated values of the RGB luminance signals of the reproduced color of the pixel of interest are outputted by the table 16.

The offset adder 17 is for simplifying the architecture of the limiter 19, described later, and the architecture of the adder 11. For example, if each of the R, G, B input signals is represented by eight bits and the range of error diffused is −128~128, applying an offset of 128 causes the output of the limiter 19 and diffusion processor 20 to attain a positive value of 0~255. The subtractor 18 subtracts the output of the offset adder 17 from the output of the adder 11 and outputs the difference to the limiter 19 as color-reproduction error. The limiter 19 limits the color-reproduction error to fall within a predetermined range and applies its output to the diffusion processor 20. In accordance with predetermined diffusion coefficients, the diffusion processor 20 diffuses the entered color-reproduction error to neighboring pixels. The diffused error is accumulated pixel by pixel and outputted to the adder 11.

By way of example, if the input signal is eight bits (0~255) for each of R, G, B, the range of error diffused is −128~128 and the offset is 128, the output of the adder 11 will be nine bits (0~512). The limiter 12 limits the nine bits of 0~512 to the range in which the input RGB signals reside, namely 128~383 (because the offset of 128 has been added on). Next, if linear quantization has been carried out, the quantizer 13 extracts the three higher order bits, from which the second bit from the MSB of each of the limited R, G, B signals has been excluded (to eliminate the offset of 128). The pattern table 14 outputs a dot pattern of four bits indicating the on/off status of the dot of each plane of C, M, Y, K stored at addresses selected by three bits for each of R, G, B, namely by a total of nine bits.

Figure 7:
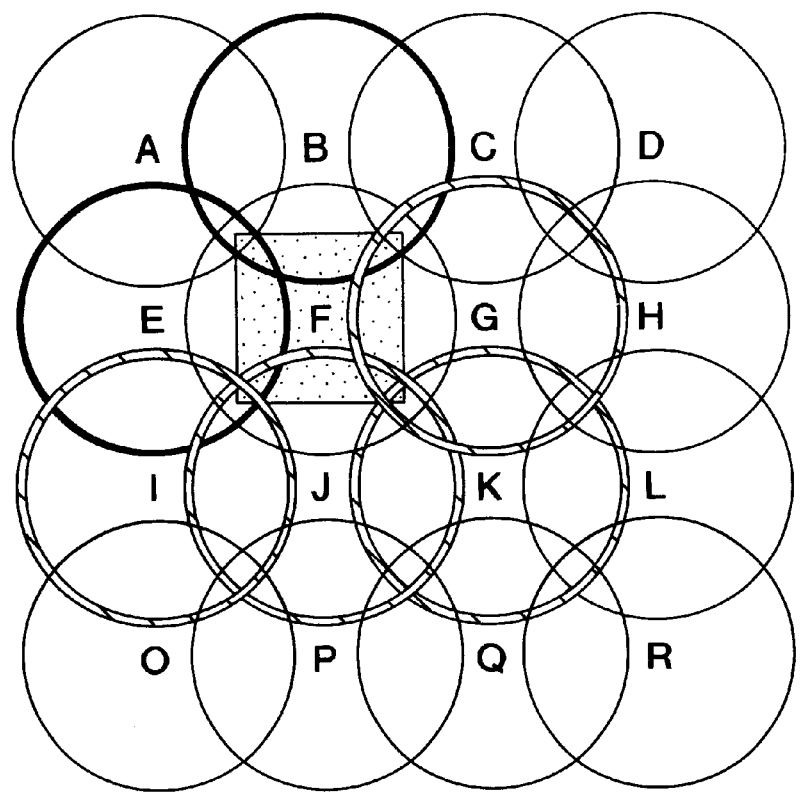
FIG. 7 is a diagram showing the spatial position of each pixel in the fifth embodiment.

If F in the pixel array shown in FIG. 7 is the pixel of interest, the buffer 15 outputs the dot patterns of pixels B and E, indicated by the bold lines, to the output luminance table 16. (The influence of the diagonally disposed pixels A, C on the pixel of interest F is assumed to be small and is ignored here.) The output luminance table 16 outputs the reproduced color of the pixel of interest from the dot patterns of the above-mentioned three pixels as eight bits for each of R, G, B. The offset adder 17 adds 128 to each of the reproduced colors of R, G, B. More specifically, the offset adder 17 outputs nine bits for each of R, G, B, in which the MSB of each reproduced color of R, G, B is adopted as the MSB after addition, the second bit from the MSB is made the reverse of the MSB and the other bits are allowed to pass through as is. The subtractor 18 subtracts the nine bits of each reproduced color to which the offset has been added from the nine bits of each of R, G, B to which the error has been added. The limiter 19 limits the results to eight bits of 0~255, which is the range of error after addition of the offset. The output of the limiter 19 is applied to the diffusion processor 20. The diffusion processor 20 diffuses the entered error to each of the pixels of G, I, J, K, which are indicated by the dashed lines in FIG. 7, by multiplying predetermined diffusion coefficients. The total of the diffusion coefficients of the diffusion processor 20 does not exceed "1", and the diffused error outputted by the diffusion processor 20 is constituted by eight bits representing 0~255.

Figure 8:
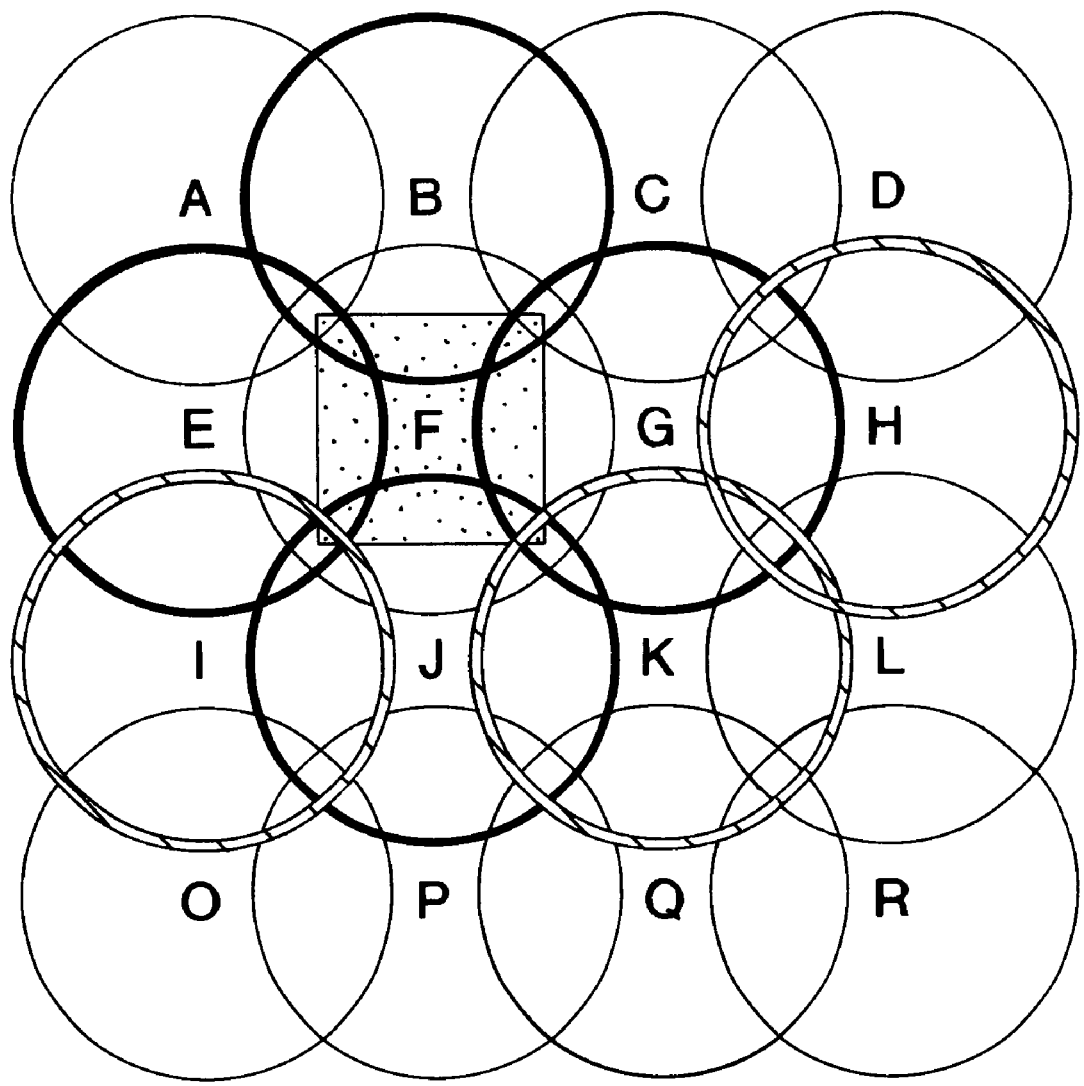
FIG. 8 is a diagram showing the spatial position of each pixel when pixels dealt with by the correction value generator are four in number.

FIG. 8 is a diagram showing an example of pixels outputted by the buffer 15 and pixels to which error is diffused at two printing passes. Here it is assumed that B, D, E, G, J, L, O, Q are printed in the first pass and A, C, F, H, I, K, P, R in the second pass. In the first pass, the reproduced color is decided based upon G, E, J and error is diffused to the pixels L, O, Q when J is the pixel of interest. In the second pass, the reproduced color is decided based upon B, E, F, G, J, which are indicated by the bold lines, and error is diffused to the pixels H, I, K, which are indicated by the dashed lines, when F is the pixel of interest. In this example, the reproduced color of the second pass has a very high precision because the dot patterns of the pixels above and below and to the left and right are established.

In FIG. 7 also the influence of pixels G and J upon the pixel of interest F can be compensated by the reproduced color which prevails when each of the pixels G and J are established. In the example of two printing passes shown in FIG. 8, phase distortion in error diffusion can be compensated for in apparent terms by making the main-scan direction in the first pass different from that in the second pass. In other words, when G is the pixel of interest in the first pass (scanning is performed from right to left), error is diffused to the pixels L, J, E. When F is the pixel of interest in the second pass (scanning is performed from left to right), error is diffused to the pixels H, I, K indicated by the dashed lines.

The output luminance table 16 is obtained by calculation from actually measured values. Accordingly, not only a density adjustment and color-balance adjustment but processing for color matching (correction of disparities in reproduced color ascribed to the output medium) also can be accommodated by rewriting the output luminance table 16 (though there are also cases in which it will be necessary to rewrite the pattern table 14).

In the description set forth above, the output luminance table 16 and offset adder 17 are constructed separately of each other. However, it is possible to delete the offset adder 17 by storing the value to which the offset has been added in the output luminance table 16. Further, in a case where the above-described processing is executed by a general-purpose processor such as a CPU or DSP, offset addition processing may be dispensed with because positive and negative values of ten or more bits are adopted as data.

Though the pattern table 14 and output luminance table 16 are implemented by LUTs, these may be implemented by logic or operational processing.

In accordance with this embodiment, as described above, an output dot pattern is generated directly from input pixel data using a LUT obtained by partitioning input color space into a predetermined number of zones and mapping an output dot pattern for each zone of partitioned space, the output dot pattern is converted to input color space using a LUT that converts a color reproduced by the output dot pattern to input color space, the difference (error) with respect to the input pixel data is obtained, and the difference value is diffused to the surrounding pixels. As a result, color reproduction and binarization processing are executed by a search of the two LUTs and a single error-diffusion processing step to obtain, in simple fashion, an image output exhibiting good color reproduction. Further, the number of dot-on-dot mixed colors of C, M, Y, K is strictly limited owing to the fact that the CMYK dot pattern is mapped.

[Second Embodiment]

A second embodiment of the invention will now be described in detail with reference to the drawings.

Figure 2:
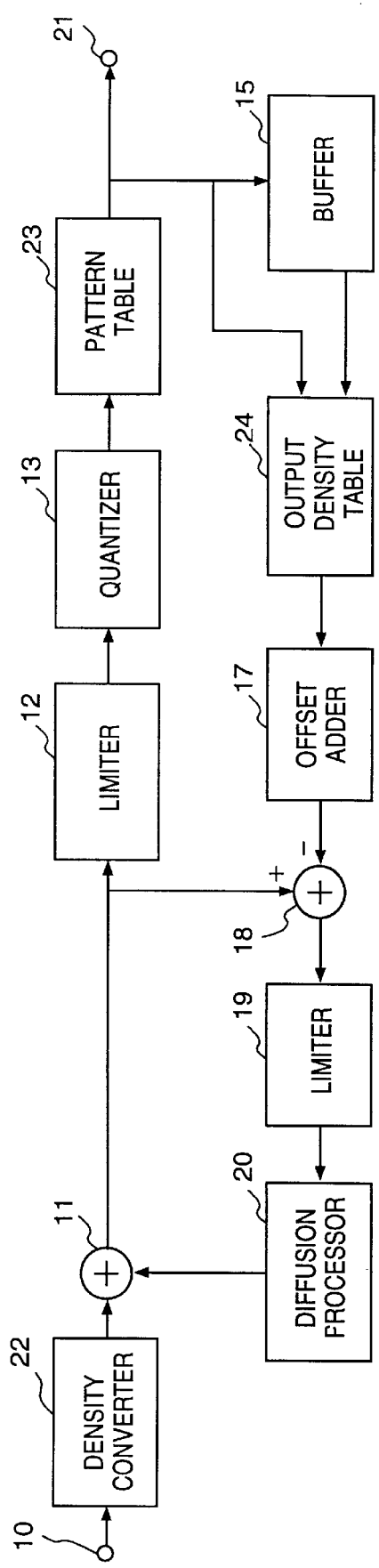
FIG. 2 is a block diagram illustrating the architecture of an image processor according to a second embodiment of the present invention.

FIG. 2 is a block diagram illustrating the architecture of an image processor according to a second embodiment of the present invention. The image processor includes a density converter 22, a pattern table 23 and an output density table 24. The other blocks are identical with those shown in FIG. 1 and need not be described again.

The luminance signals of RGB entered from the input terminal 10 are converted to density signals of C, M, Y. The error-diffusion processing implemented by the subtractor 18, limiter 19, diffusion processor 20 and adder 11 is executed in the above-described CMY density space. Accordingly, the output dot patterns of the pattern table 23 are mapped in the above-described CMY density space and the reproduced color of a pixel of interest which takes into account the effects of neighboring pixel overlap is calculated in the form of CMY density signals. The values obtained are stored in the output density table 24 in advance.

In accordance with this embodiment, color-reproduction error-diffusion processing is executed in linear density space with respect to the sense of sight, whereby an image output exhibiting even better color reproduction is obtained.

[Third Embodiment]

A third embodiment of the invention will now be described in detail with reference to the drawings.

Figure 3:
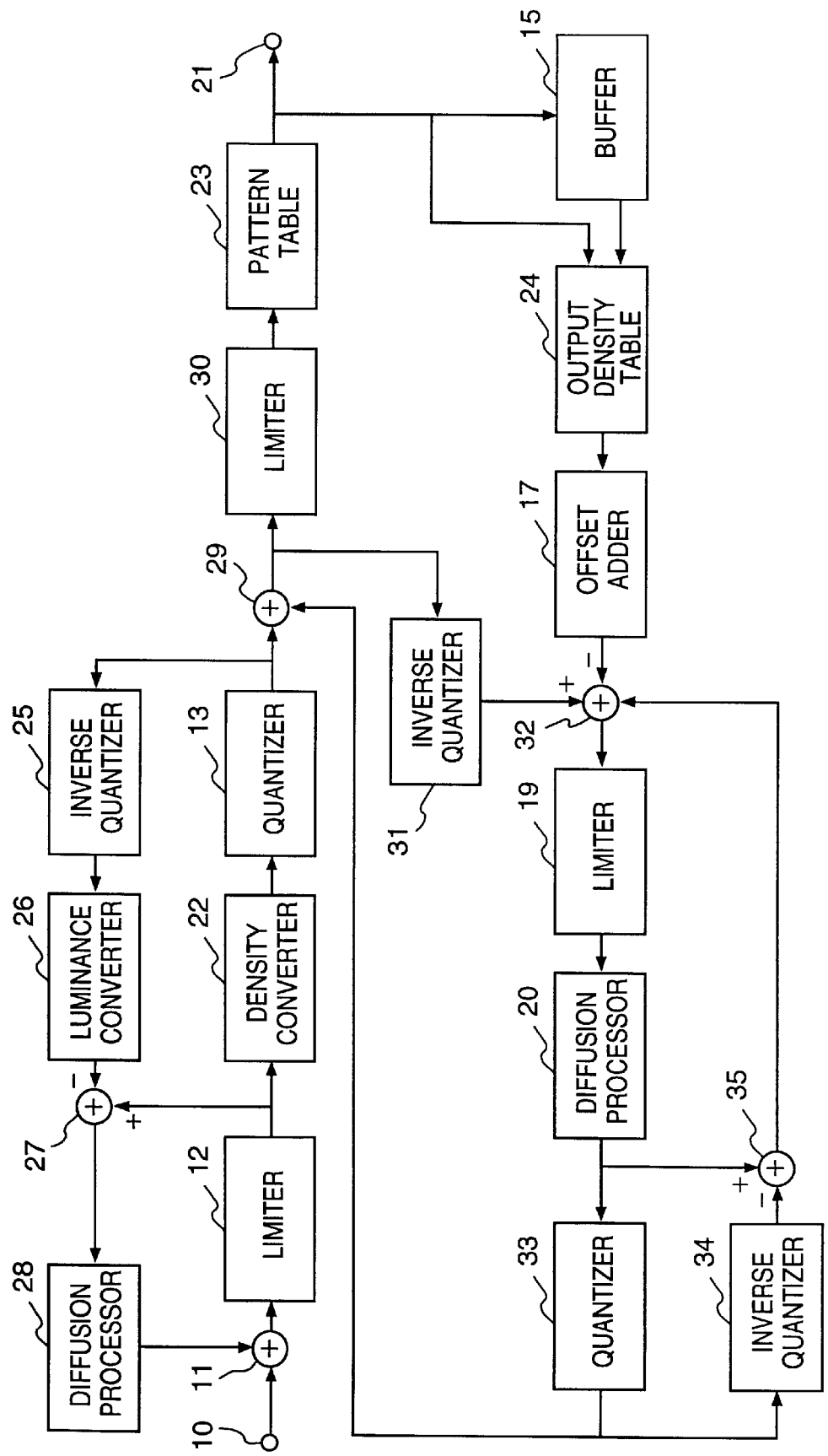
FIG. 3 is a block diagram illustrating the architecture of an image processor according to a third embodiment of the present invention.

FIG. 3 is a block diagram illustrating the architecture of an image processor according to a third embodiment of the present invention. The image processor includes an inverse quantizer 25, a luminance converter 26, a subtractor 27, a diffusion processor 28, an adder 29, a limiter 30, an inverse quantizer 31, an adder/subtractor 32, a quantizer 33, an inverse quantizer 34 and a subtractor 35. The other blocks are identical with those shown in FIG. 2 and need not be described again.

The luminance signals of RGB entered from the input terminal 10 are applied to the adder 11, which sums these with an error signal from the diffusion processor 28 per each luminance signal of R, G, B, the error signal being the result of density conversion and quantization. The output of the adder 11 enters the limiter 12 and subtractor 27. The limiter 12 limits the output of the adder 11 to the range in which input RGB luminance signals reside and outputs the result to the density converter 22. The latter converts the RGB luminance signals to CMY density signals and outputs the CMY density signals to the quantizer 13. The quantizer 13 is for reducing the number of input bits to the pattern table 23. For example, nine bits for each of C, M, Y are quantized to three bits for each of C, M, Y. The quantized CMY density signal are restored to the RGB density signals via the inverse quantizer 25 and density converter 26. The subtractor 27 subtracts the restored RGB luminance signals from the RGB outputs of the limiter 12, whereby the error due to density conversion and quantization is calculated. The calculated error is diffused to the neighboring pixels by the diffusion processor 28 and the accumulated error is outputted to the adder 11.

The quantized CMY density signals enter the adder 29 as well. Here the error signal that accompanies color reproduction is summed with each of the C, M, Y signals and the sum is entered into the limiter 30 and inverse quantizer 31. The limiter 30 limits the output of the adder 29 to the range in which the quantized CMY signals reside and outputs the result to the pattern table 23. The inverse quantizer 31 converts the quantized CMY signals to a quantized representative values, whereby conformity with the digits of the CMY signals outputted by the offset adder 17 is attained.

The adder/subtractor 32 subtracts the CMY signals outputted by the offset adder 17 from the quantized representative values of the CMY signals outputted by the inverse quantizer 31 and, at the same time, adds the quantization error, due to the quantizer 33, outputted by the subtractor 35. The output of the adder/subtractor 32 is limited to fall within a predetermined range by the limiter 19 and the result is diffused to the neighboring pixels by the diffusion processor 20. The diffused error is accumulated pixel by pixel and outputted to the quantizer 33 and subtractor 35. The quantizer 33 quantizes the error signal through a technique identical with that used by the quantizer 13. The quantized error signal is outputted to the adder 29 and inverse quantizer 34. The inverse quantizer 34 converts the quantized error signal to a quantized representative value and the subtractor 35 obtains the difference between this and the signal prior to quantization, thereby calculating the quantization error and outputting the same to the adder/subtractor 32.

The density converter 22, quantizer 13, inverse quantizer 25, luminance converter 26 and subtractor 27 can be implemented by a single LUT. In other words, it will suffice to produce a table which outputs quantization error, which is inclusive of the quantization density signal and conversion error, with respect to each input signal of R, G, B. Similarly, the quantizer 33, inverse quantizer 34 and subtractor 35 can be implemented by a single LUT.

Thus, since color-reproduction error-diffusion processing is executed in quantized density space, the numbers of bits of the adder 29 and limiter 30 as well as the memory capacity of the diffusion processor 20 (in a case where line delay is implemented by data after quantization) can be reduced.

In accordance with this embodiment, processing for diffusing an error due to density conversion and quantization is executed in RGB luminance space and color-reproduction error-diffusion processing is executed in output density space. Consequently, error diffusion is performed in the ideal space. Further, error due to density conversion is corrected. As a result, an image output exhibiting even better color reproduction is obtained. In addition, color-reproduction error-diffusion processing is executed in quantized density space, thereby making it possible to reduce the amount of hardware.

[Fourth Embodiment]

A fourth embodiment of the invention will now be described in detail with reference to the drawings.

Figure 4:
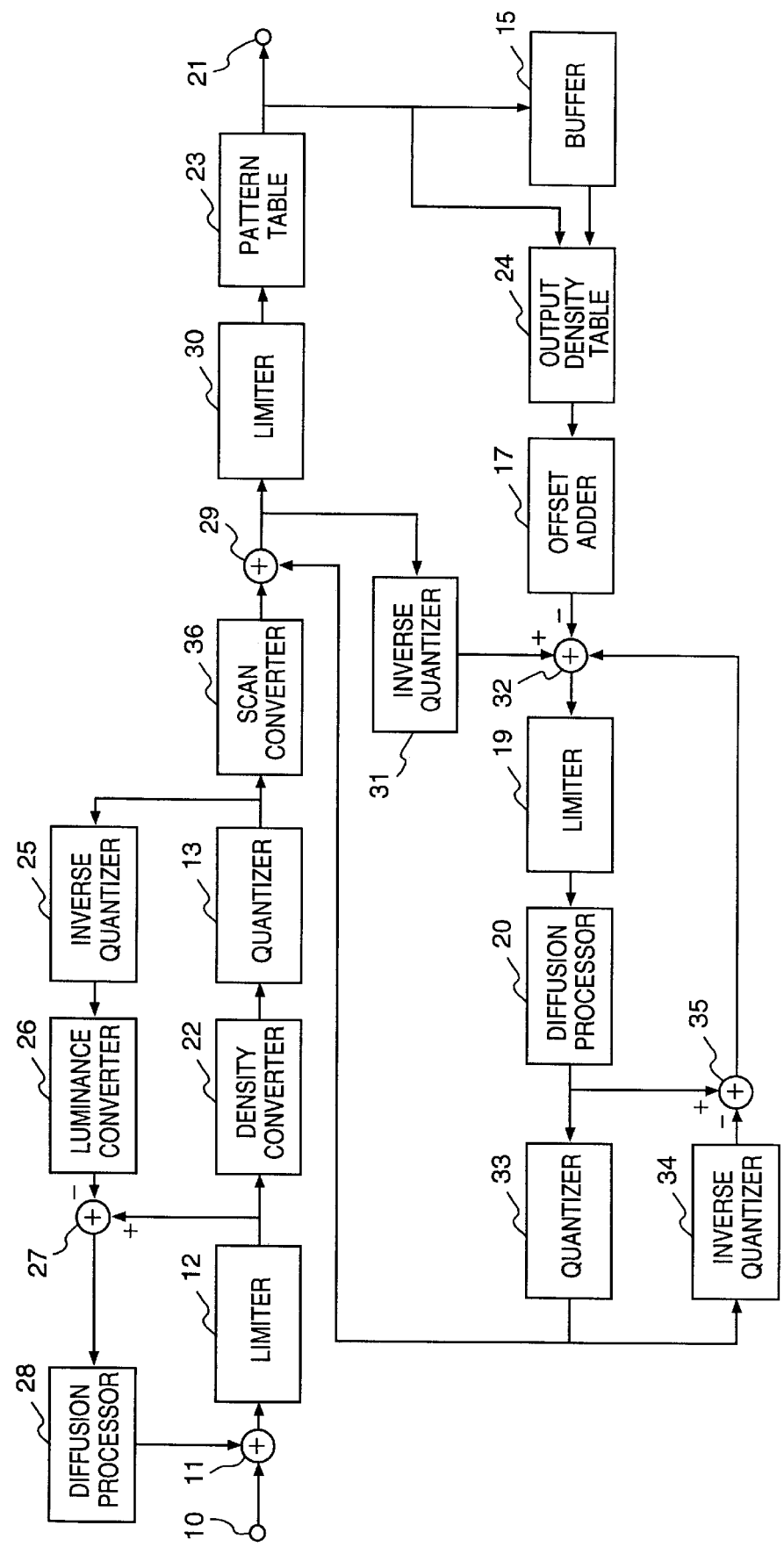
FIG. 4 is a block diagram illustrating the architecture of an image processor according to a fourth embodiment of the present invention.

FIG. 4 is a block diagram illustrating the architecture of an image processor according to a fourth embodiment of the present invention. The image processor includes a scan converter 36. The other blocks are identical with those shown in FIG. 3 and need not be described again.

The scan converter 36 performs a conversion to reverse the scan direction of the main scan of the quantized density signal. More specifically, in a case where the RGB luminance signal that has entered from the input terminal 10 is scanned from left to right, the scan converter 36 effects a change so that scanning is performed from right to left. As a result, the diffusion coefficients in the main-scan direction of the error due to the diffusion processor 28 and the diffusion coefficients in the main-scan direction of the error due to the diffusion processor 20 become symmetrical and an improvement is obtained in phase distortion due to error diffusion.

In accordance with this embodiment, a scan conversion is executed between processing for diffusing an error produced at the time of density conversion and partitioning of color space and processing for diffusing color-reproduction error, as a result of which the scanning direction of each error diffusion is reversed to improve upon phase distortion caused by error diffusion.

[Fifth Embodiment]

A fifth embodiment of the invention will now be described in detail with reference to the drawings.

Figure 5:
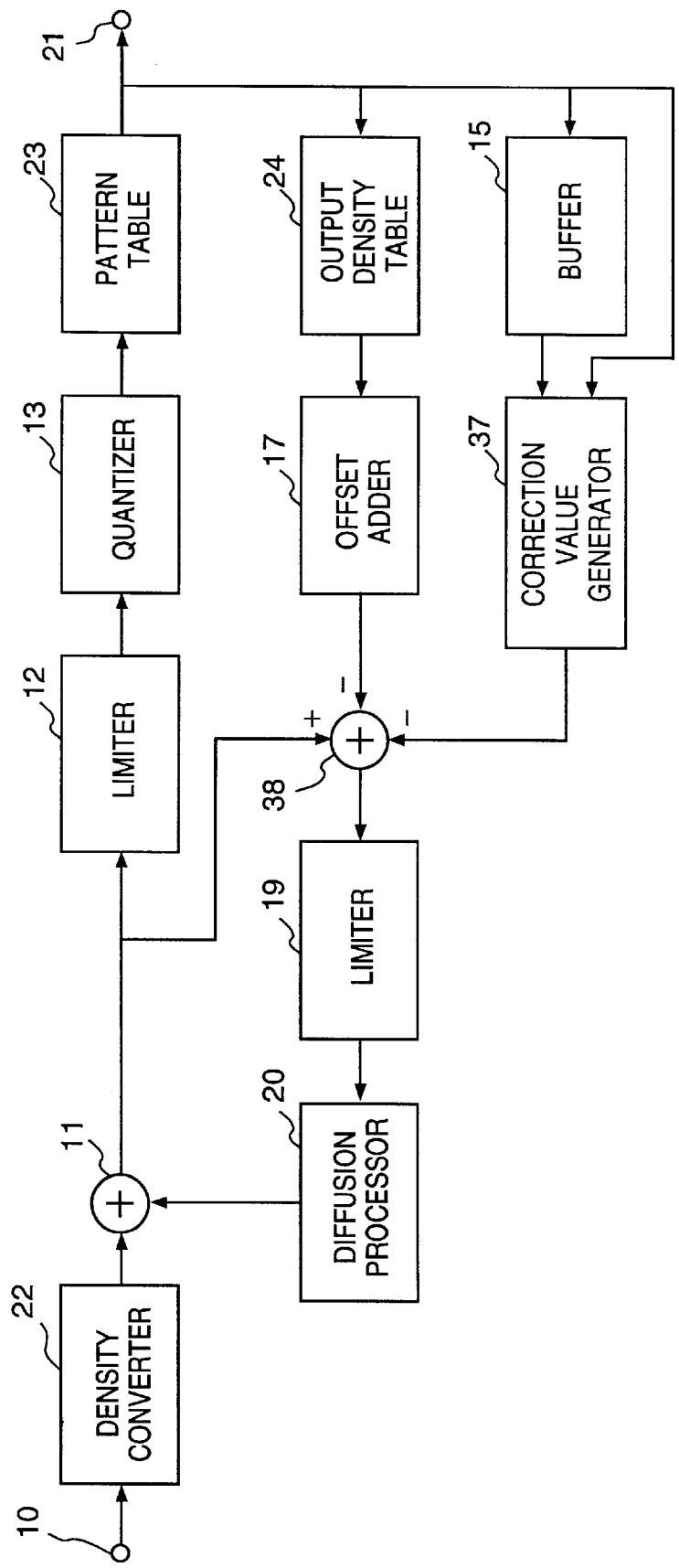
FIG. 5 is a block diagram illustrating the architecture of an image processor according to a fifth embodiment of the present invention.

FIG. 5 is a block diagram illustrating the architecture of an image processor according to a fifth embodiment of the present invention. The image processor includes a correction value generator 37 and an adder/subtractor 38. The other blocks are identical with those shown in FIG. 2 and need not be described again.

The buffer 15 outputs the dot patterns of pixels spatially neighboring a pixel of interest to the correction value generator 37. The dot pattern of the pixel of interest and the dot patterns of the neighboring pixels enter the correction value generator 37. The latter generates a correction value, based upon overlap of neighboring pixels, with regard to the reproduced color of the pixel of interest outputted by the output density table 24.

Figure 6:
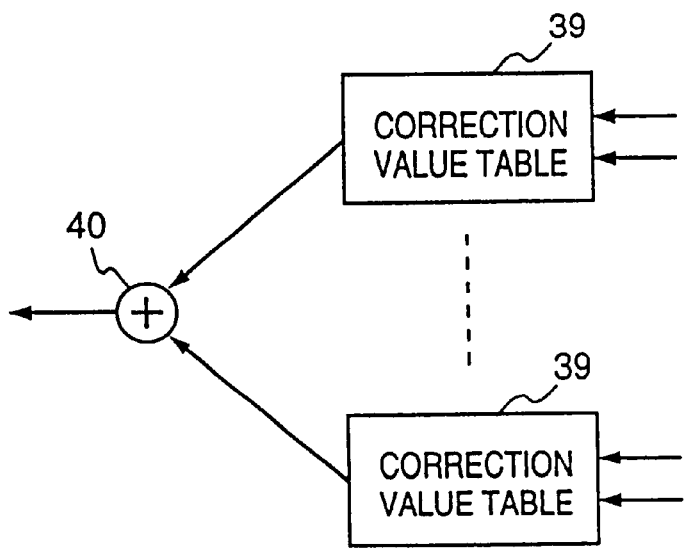
FIG. 6 is a block diagram illustrating the architecture of a correction value generator according to the fifth embodiment of the present invention.

FIG. 6 is a block diagram illustrating the specific architecture of the correction value generator 37 according to this embodiment.

As shown in FIG. 6, the correction value generator 37 includes correction value tables 39 the number of which corresponds to the number of pixels spatially neighboring the pixel of interest outputted by the buffer 15, and an adder 40 for totalizing the correction values from the correction value table 39. The dot pattern of the pixel of interest and the dot pattern of one neighboring pixel enter each correction value table 39, and each correction value table 39 outputs a correction value, which is based upon overlap of the dot patterns of the two pixels. The adder 40 totalizes the correction values from the correction value tables and outputs the result to the adder/subtractor 38.

By way of example, there would be two correction value tables 39 in the case of the pixel array shown in FIG. 7. If F is the pixel of interest, the dot patterns of B and F enter one correction value table and the dot patterns of E and F enter the other correction value table. Since the influence of overlap is determined by the combination of the two pixels, it will suffice to effect a correction by either one. In other words, the influence of overlap of G and J should be corrected on the basis of the reproduced colors of G and J.

To correct the influence of the overlap of three pixels B, E, F and B, F, G in order to obtain a more precise correction value, correction tables for combinations of these three pixels should be added on. Since the dot pattern of the pixel G must be established in such case, the reproduced-color error outputted by the limiter 19 would be diffused to pixels from H onward, e.g., pixels H, I, J, K.

In accordance with this embodiment, processing is provided for correcting a shift in reproduced color due to overlap between the pixel of interest and the neighboring pixels. Consequently, it is no longer necessary to take into account the influence of neighboring pixel overlap in the output density table 24 and the input is only the dot pattern of the pixel of interest, as a result of which the required capacity of the table becomes very small. In addition, the capacity of the correction value table 39 need only be enough for the combination of dot patterns of two pixels, namely the upper and lower pixels.

[Sixth Embodiment]

A sixth embodiment of the invention will now be described in detail with reference to the drawings.

Figure 9:
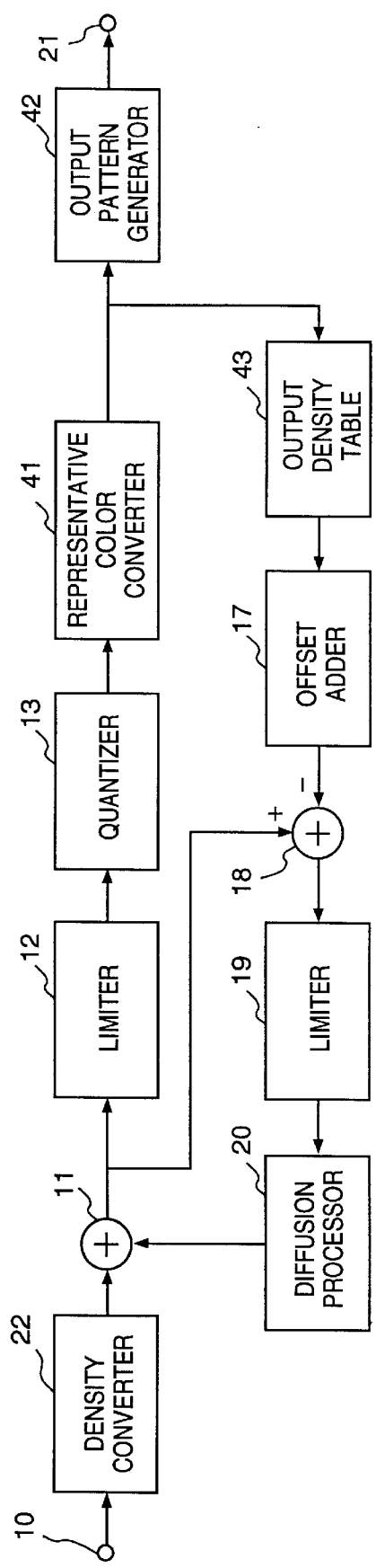
FIG. 9 is a block diagram illustrating the architecture of an image processor according to a sixth embodiment of the present invention.

FIG. 9 is a block diagram illustrating the architecture of an image processor according to a sixth embodiment of the present invention. The image processor includes a representative color converter 41, an output pattern generator 42 and an output density table 43. The other blocks are identical with those shown in FIG. 2 and need not be described again.

The representative color converter 41 selects a representative color corresponding to the quantized CMY density signals and outputs an ID code, which identifies this representative color, to the output pattern generator 42 and output density table 43. The output pattern generator 42 generates the dot patterns of C, M, Y, K from the ID code identifying the representative color. These dot patterns are outputted to the printer engine (not shown) from the output terminal 21.

On the basis of the ID code identifying the representative color, the output density table 43 generates a value obtained by converting the reproduced color of this representative color to CMY density signals and outputs the value to the offset adder 17.

This embodiment is an example of an arrangement for a case where one pixel of image data that enters from the input terminal 10 is expressed by a plurality of dots. For example, assume a case where one pixel of input image data is constituted by the four dots F, G, J, K, as indicated by the shaded portion in FIG. 12. If the eight colors C, M, Y, K, R, G, B, W can be expressed by one dot in this case, then 666 colors can be expressed, taking into account differences in overlap. (When 11 colors are expressed by one dot, 2046 colors can be expressed.) If 512 colors for which the spacing is uniform are selected as representative colors from the above-mentioned 666 colors to maximize the color reproduction range in uniform perceptual space such as Lab and Luv, the ID code will have nine bits. If quantization to the four higher order bits of each color is performed by the quantizer 13, the representative color converter 41, output pattern generator 42 and output density table 43 can be implemented by LUTs of 2048×9, 512×16 and 512×24, respectively.

In accordance with this embodiment, one pixel is expressed by N dots (where N is an integer of two or greater), as a result of which enlargement processing is dispensed with when an image is enlarged by a factor of N (area). Further, one color is expressed by N dots so that the effects of peripheral dot overlap are diminished in comparison with expression by one dot (the larger N is made, the smaller the influence). Consequently, the precision of reproduced color data is improved as well as color reproducibility. In addition, the output density table 43 can be readily constructed by outputting a patch of each representative color from the printer and measuring the patch. Accordingly, color matching can readily be implemented by actually measuring the patch and updating the output density table 43.

[Seventh Embodiment]

A seventh embodiment of the invention will now be described in detail with reference to the drawings.

Figure 10:
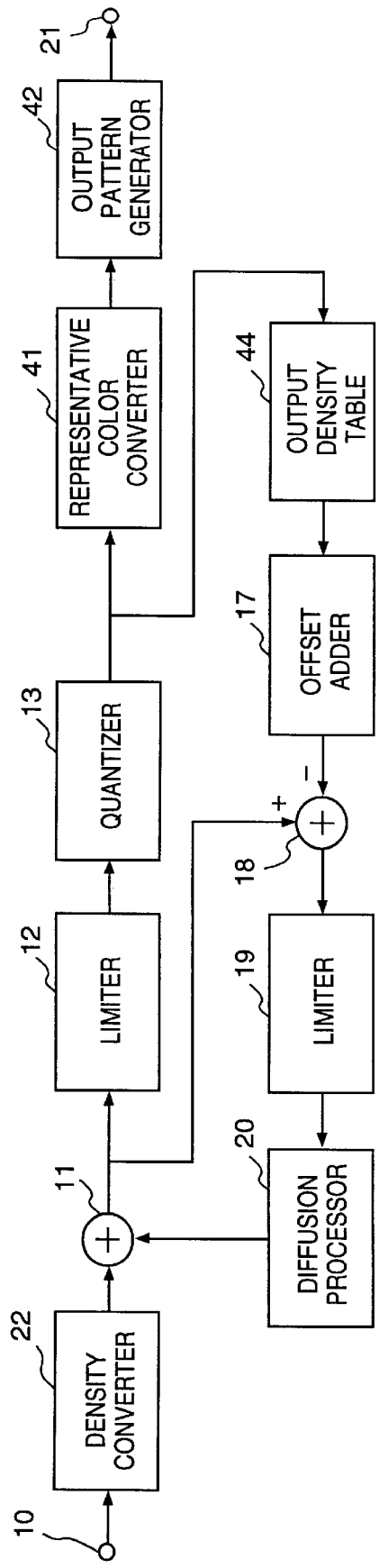
FIG. 10 is a block diagram illustrating the architecture of an image processor according to a seventh embodiment of the present invention.

FIG. 10 is a block diagram illustrating the architecture of an image processor according to a seventh embodiment of the present invention. The image processor includes an output density table 44. The other blocks are identical with those shown in FIG. 9 and need not be described again.

On the basis of a quantized CMY density signal, the output density table 44 of this embodiment generates a value obtained by converting the reproduced color of this representative color to CMY density signals and outputs the value to the offset adder 17. In other aspects operation is the same as that of the sixth embodiment.

In accordance with this embodiment, CMY density values of a reproduced color are generated directly from quantized CMY density signals. As a result, the processing performed by the output density table 44 is made faster than that of the sixth embodiment to the degree that processing is performed by the representative color converter 41. Further, in a case where the number of bits of the ID code which identifies the representative color is greater than the number of bits of the quantized CMY density signals, the capacity required for the output density table 44 can be reduced.

[Eighth Embodiment]

An eighth embodiment of the invention will now be described in detail with reference to the drawings.

Figure 11:
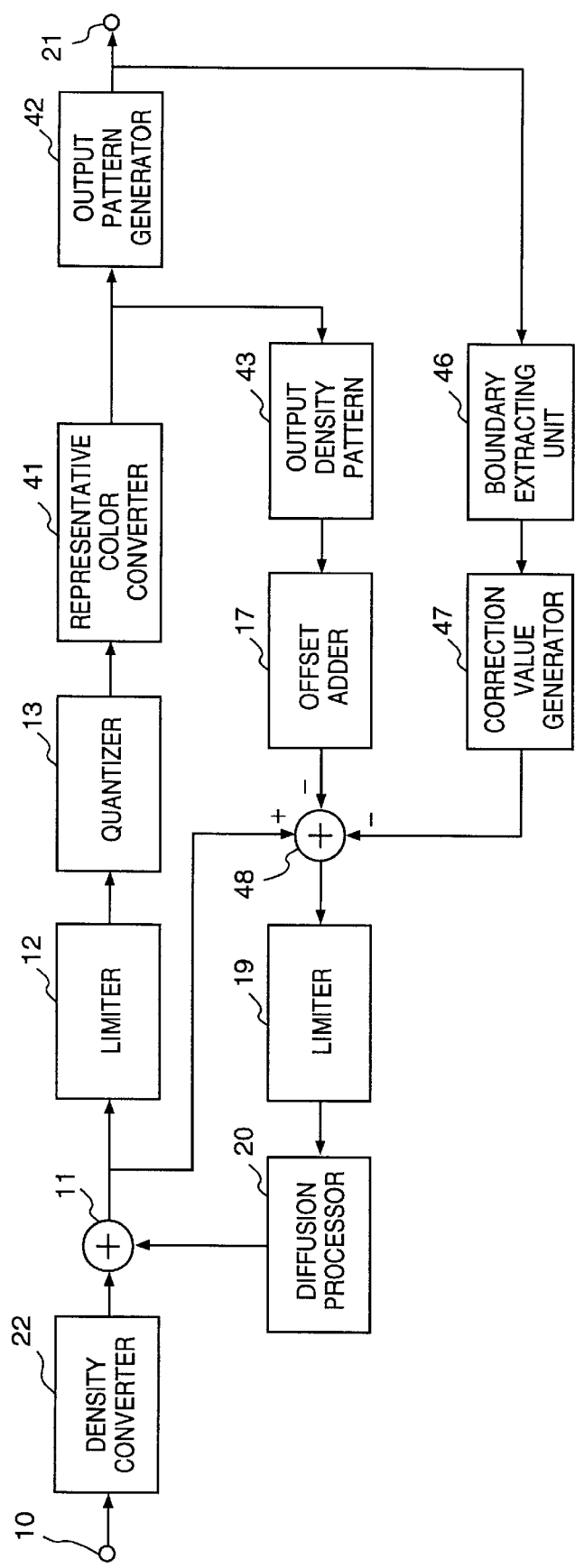
FIG. 11 is a block diagram illustrating the architecture of an image processor according to an eighth embodiment of the present invention.

FIG. 11 is a block diagram illustrating the architecture of an image processor according to an eighth embodiment of the present invention. The image processor includes a boundary extracting unit 46, a correction value generator 47 and an adder/subtractor 48. The other blocks are identical with those shown in FIG. 9 and need not be described again.

The boundary extracting unit 46 outputs the dot patterns at the boundary of the pixel of interest and neighboring pixels to the correction value generator 47. The correction value generator 47 generates a correction value based upon overlap at the boundary from the dot patterns at the boundary of the pixel of interest and neighboring pixels and outputs the correction value to the adder/subtractor 48 to correct for the effects of the boundary. The architecture of the correction value generator 47 is the same as that of the correction value generator in FIG. 6 of the fifth embodiment and need not be described again.

Figure 12:
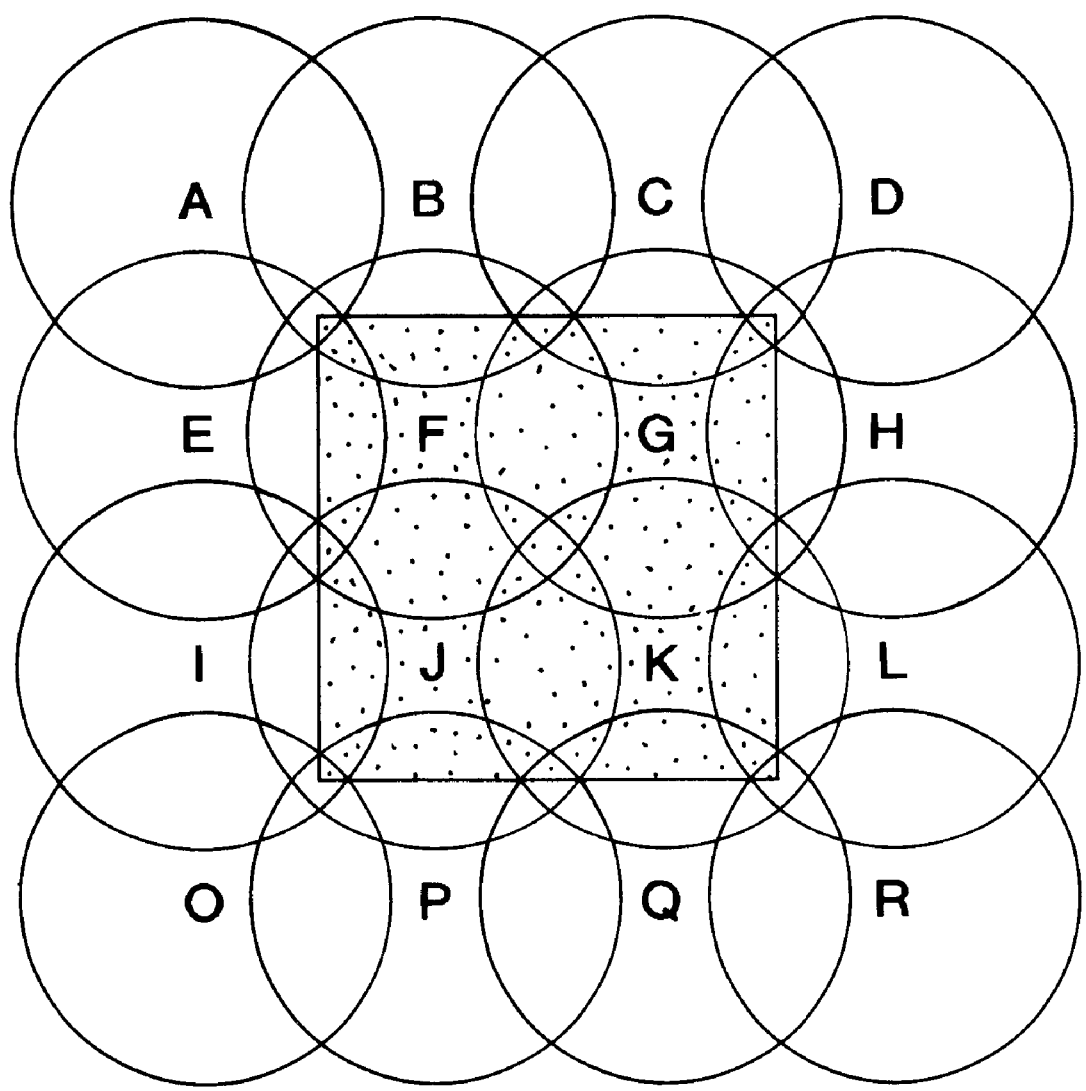
FIG. 12 is a diagram showing the spatial position of each pixel in the eighth embodiment.

By way of example, in a case where one pixel of input image data is constituted by the four dots F, G, J, K, as indicated by the shaded portion in FIG. 12, the boundary extracting unit 46 extracts the seven pixels B, C, E, F, G, I, J. The correction value generator 47 enters the four sets of dot patterns BF, CG, EF, IJ to each correction value table, the correction values of the correction value tables are totalized and the total is outputted to the adder/subtractor 48 as the correction value of the boundary.

In accordance with this embodiment, processing is provided for correcting a shift in reproduced color due to overlap at the boundary of a pixel of interest and neighboring pixels, as a result of which the accuracy of color-reproduction error is improved as well as color reproducibility.

In this embodiment, correction processing is applied to the boundary of the top and left pixels. However, this does not impose a limitation upon the invention. For example, in order to conserve on buffer, processing may be applied solely to the boundary on the left side.

[Ninth Embodiment]

A ninth embodiment of the invention will now be described in detail with reference to the drawings.

Figure 13:
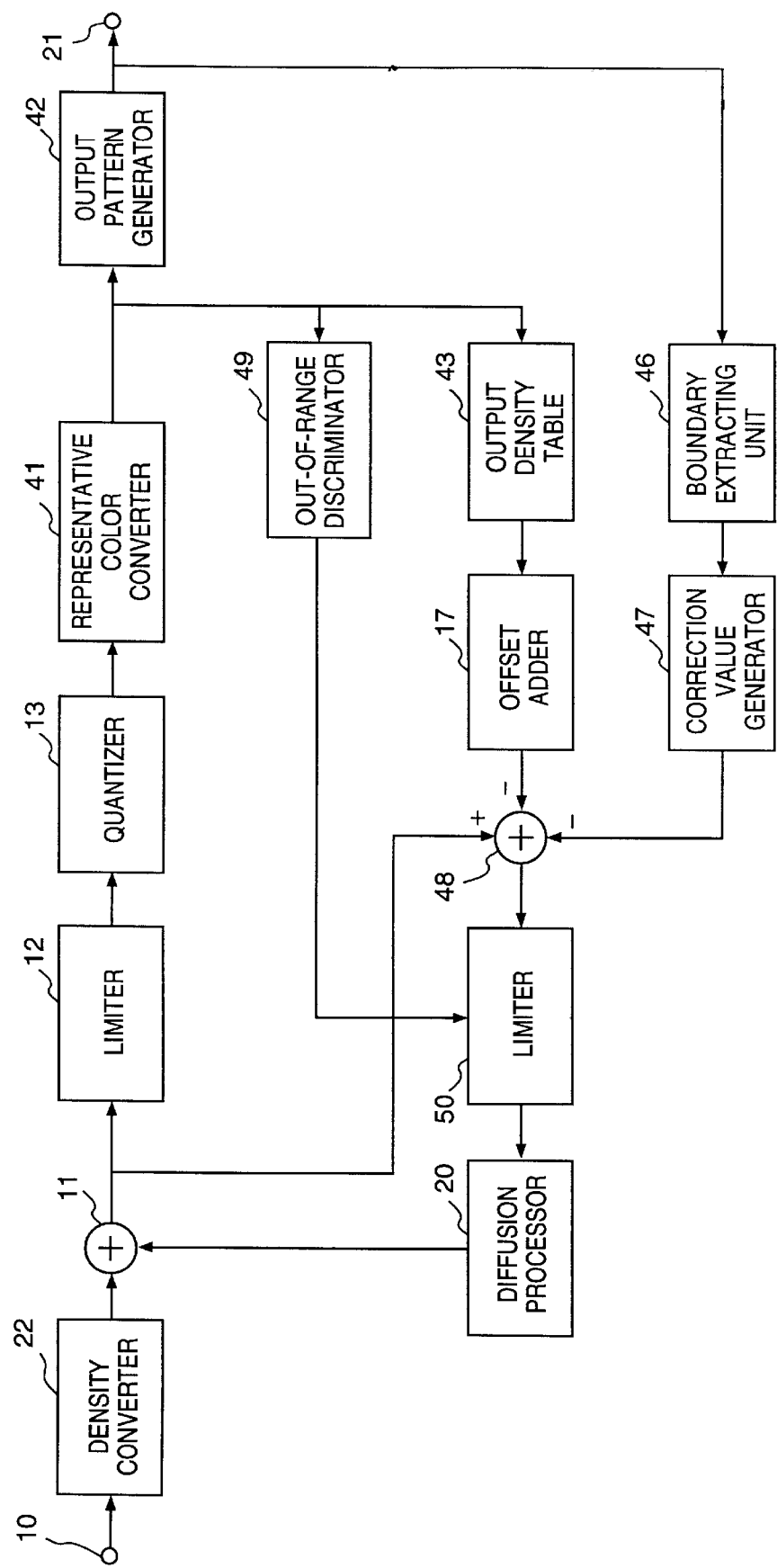
FIG. 13 is a block diagram illustrating the architecture of an image processor according to a ninth embodiment of the present invention.

FIG. 13 is a block diagram illustrating the architecture of an image processor according to a ninth embodiment of the present invention. The image processor includes an out-of-range discriminating unit 49 and a limiter 50. The other blocks are identical with those shown in FIG. 11 and need not be described again.

The discriminating unit 49 determines whether a representative color mentioned above is a color on the boundary of the color reproduction range. If this is found to be the case, error in a direction outside the color reproduction range is made "0" by the limiter 50.

In a case where colors outside the color reproduction range of the representative color have entered in succession, the input color cannot be reproduced. As a consequence, error accumulates and color reproducibility declines. In this embodiment, however, the error in the direction outside the color reproduction range is made "0" by the limiter 50 so that error does not accumulate. This makes it possible to prevent a deterioration in color reproducibility of the input color within the color reproduction range. In this case, the output image is an image whose input color outside the color reproduction range has been limited to the nearest representative color.

In this embodiment, the determination as to whether a representative color is outside the color reproduction range is implemented by the ID code identifying the representative color. However, this does not impose a limitation upon the invention. For example, the input to the discrimination unit 49 may be quantized CMY density signals. In such case the output of the representative color converter 41 would be increased by one bit and the additional bit would be connected to the limiter 50.

Further, accumulation of the error due to an input color outside the color reproduction range of the representative color can be prevented by setting part of the reproduced color (the color on the outermost contour of the color reproduction range), which is stored in the output density table 43, in such a manner that it will include the color reproduction boundary of input color space. In such case the discrimination unit 49 will be unnecessary. Furthermore, the output image is an image in which input color outside the color reproduction range is compressed to fall within the color reproduction range (the reproducibility of the color in the proximity of the boundary of the color reproduction range does not undergo compensation).

[Tenth Embodiment]

Figure 14:
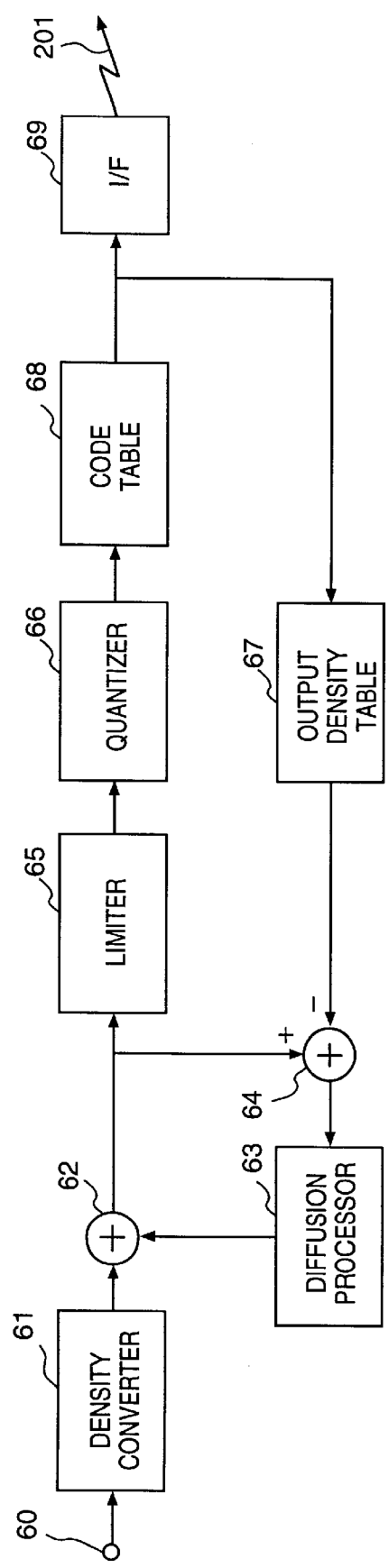
FIGS. 14 and 15 are block diagrams illustrating the architecture of an image processor according to a tenth embodiment of the present invention.
Figure 15:
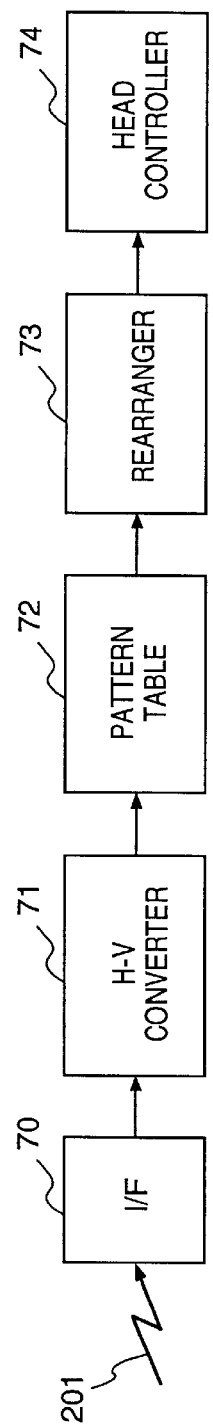

FIGS. 14 and 15 are block diagrams illustrating the architecture of an image processor according to a tenth embodiment of the present invention. The image processor has an input terminal 60, a density converter 61, an adder 62, a diffusion processor 63, a substractor 64, a limiter 65, a quantizer 66, an output density table 67, a code table 68, interfaces 69, 70, an H-V converter 71, a pattern table 72, a rearranger 73 and a head controller 74.

In this embodiment, it is assumed that a 1200 dpi (dot per inch) output is obtained in response to a 300 ppi (pixel per inch) input. Further, the components from the input terminal 60 to the interface 69 are implemented by processing on the side of a host (a printer driver), and the components from the interface 70 to the head controller 74 are implemented by processing on the side of the printer.

Each of the signals R, G, B that have entered from the input terminal 60 are converted to density signals C, M, Y by the density converter 61. The CMY density signals resulting from the conversion are summed by the adder 62, signal by signal, with an error signal produced by the diffusion processing 63, described later, and the output of the adder 62 enters the limiter 65 and subtractor 64. The limiter 65 limits the output of the adder 62 to the range in which the CMY signals reside and outputs the result to the quantizer 66. The quantizer 66 is for reducing the number of input bits to the code table 68. For example, nine bits for each of C, M, Y are quantized to four bits for each of C, M, Y.

Codes corresponding to representative colors, described later, are mapped in the code table 68 in advance. When quantized CMY signals enter the code table 68, representative color codes corresponding to the CMY signals are outputted. The representative color codes enter the H-V converter 71 via the interface 69 on the host side, a transmission line 201 (usually a printer cable) and the interface 70 on the printer side. In conformity with the dot array of the print head, the H-V converter 71 alters the order in which the representative color codes are read out. The pattern table 72 converts an entered representative color code to an output dot pattern. The rearranger 73 rearranges the order in which converted dot patterns are transmitted to the head controller 74. The latter prints the entered dot data. The conversion to the output dot pattern by the pattern table 72 and the rearrangement of the head transmission data by the rearranger 73 are executed in sync with head control (by the printer engine). Further, since the CMYK heads usually are arranged in spaced-apart relation, the elements from the H-V converter 71 onward are implemented independently for each color. Accordingly, the pattern table 72 actually is separated according to color and outputs a dot pattern for any of C, M, Y, K in response to an input code.

Data corresponding to a density observed when a dot pattern corresponding to a representative color code has been printed, i.e., the color reproduced by the printer, is stored in the output density table 67. The difference between the output of table 67 and the input data, namely the output density error, is calculated by the subtractor 64 and the error is distributed to the neighboring pixels by the diffusion processor 63 in accordance with a well-known error diffusion method.

In order to express a 1200-dpi CMYK dot pattern by 300 ppi, $4 \times 4 \times 4 = 64$ bits are required. If a representative color code is composed of eight bits, data compression to $8/64 = 1/8$ is possible. Among the $2^{64}$ output patterns mentioned above, the number of identifiable is fairly small. In addition, there are disparities due to positional precision, dot diameter and dot density (shading) of the output dots. In view of these facts, if suitable representative colors are selected, the output image will be almost unchanged even if the number of representative colors is made fairly small. On the other hand, reducing the number of representative colors to a significant degree makes it possible to reduce the number of items of data transmitted over the transmission line 201. This not only makes it possible to curtail transmission time but also makes it possible to greatly reduce the buffer capacity needed by the H-V converter 71 and to lower the cost of the printer. In regard to colors other than the representative colors, these are expressed by a combination of representative colors by means of error diffusion at 300 dpi mentioned above.

Figures 16, 17:
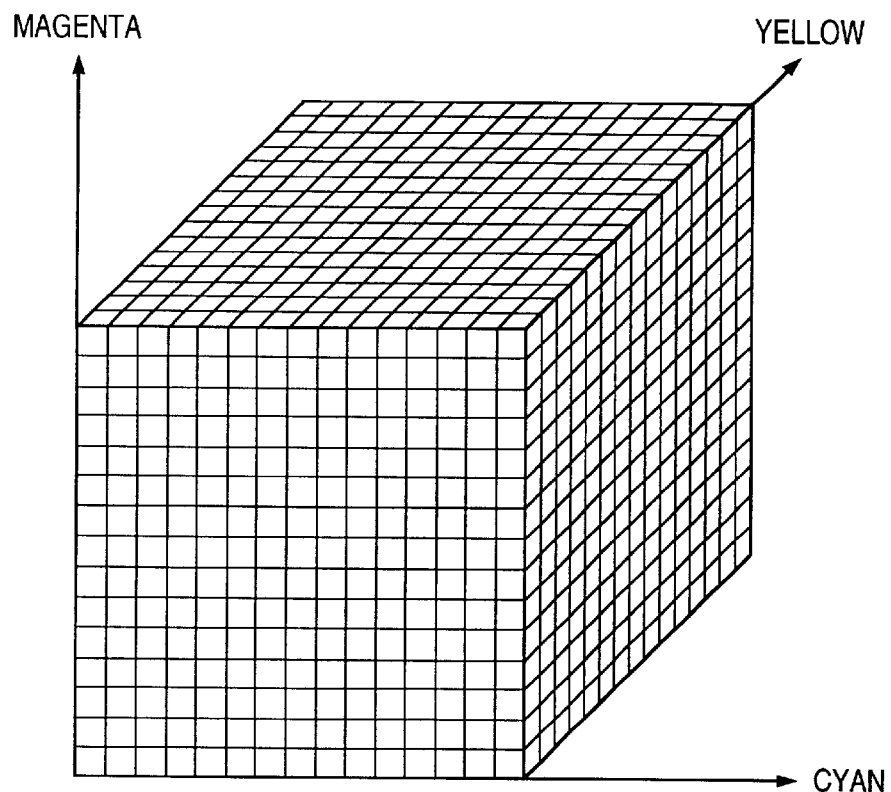
FIG. 16 is a diagram showing the concept of a code table according to the tenth embodiment.
FIG. 17 is a diagram showing a specific example of the code table.

FIG. 16 is a diagram illustrating the concept of the code table 68 according to this embodiment.

Since the input CMY color space is quantized to four bits for each color by the quantizer 66, representative color codes corresponding to the lattice points of FIG. 16 are mapped. This arrangement resembles a three-dimensional LUT color conversion method. However, in the three-dimensional LUT color conversion method, the color data of all lattice points of a small cube are outputted and linear interpolation is performed by the lower order bits discarded at the time of quantization. With the arrangement of this embodiment, the representative color code of one corresponding lattice point is outputted, the output density table 67 converts this to the reproduced color of the printer and the subtractor 64 obtains the difference between this and the input data prior to quantization and diffuses this to the neighboring pixels as an error, thereby correcting for the quantization error. More specifically, two errors, namely the quantization error and the output density error of the printer, are corrected for by a single error diffusion. Accordingly, the conventionally executed color processing and binarization processing can both be consolidated in the simple architecture described above. In addition, data compression based upon reduction of representative colors is executed at the same time. Further, a resolution conversion can be executed at the same time by changing the size of the output dot pattern of pattern table 72 (which, in this embodiment, is 4×4 owing to multiplication by a factor of four in both the main-and sub-scan directions). As a result, the number of pixels processed is greatly reduced, processing is simplified and can be executed at very high speed.

A method of generated the above-mentioned table will now be described.

Figures 18, 19:
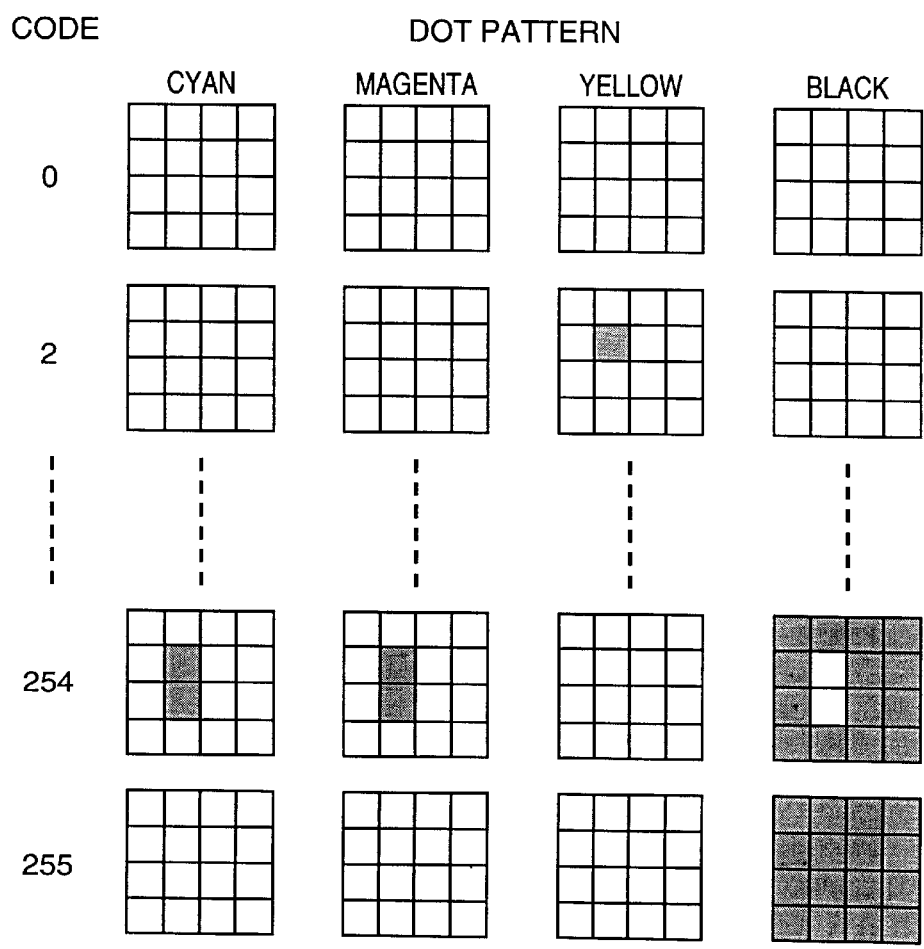
FIG. 18 is a diagram showing a specific example of an output density table.
FIG. 19 is a diagram showing a specific example of a pattern table.
Figure 20:
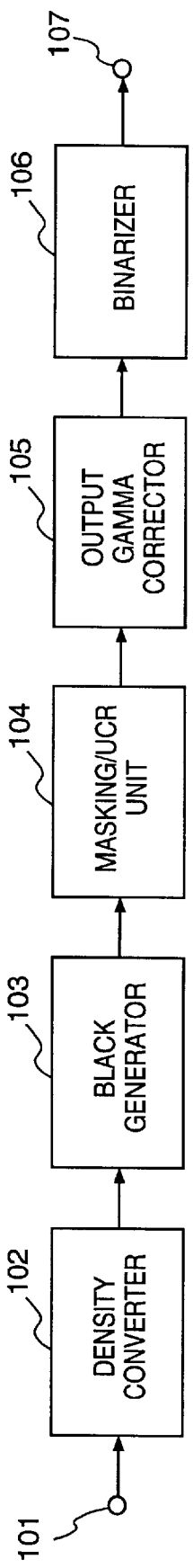
FIG. 20 is a block diagram illustrating the architecture of an example of the prior art.

FIG. 19 is a diagram showing a specific example of the pattern table 72 according to this embodiment.

The dot pattern of each of the colors C, M, Y, K shown in FIG. 19 is set and the representative colors are decided. By way of example, the following methods are available as methods of deciding representative colors:

(1) Patches based upon all output patterns are outputted by the printer, the colors of the patches are measured and 256 patterns, for example, are selected in such a manner that gradation will rendered uniform in a specific color space (input CMY space, L*a*b* space, etc.).

(2) The relationship between dot pattern and reproduced color is modeled, reproduced colors with regard to all output patterns are obtained by calculation and patterns are selected in such a manner that gradation will rendered uniform in a specific color space, in the same manner as set forth in (1) above.

However, since all output patterns are $2^{64}$ in number, as mentioned above, searching all of the output patterns is not realistic. Accordingly, the number of patterns dealt with is reduced by limiting the number of mixed colors or by excluding coincidence of patterns resulting from rotation of mirror images, the number of patterns is reduced to the number of measurable patterns (e.g., 1000 patterns) by the modeling mentioned in (2) above, and then the operation of (1) is carried out. At this time patterns exhibiting large variances in measurement are excluded as unstable patterns or 256 representative colors are decided upon taking into account a prohibition on reduction of independent dot patterns in order to reduce graininess in highlighted portions. In other words, the $2^{64}$ patterns are limited to 1000 patterns by the modeling mentioned in (2) above, patches of the 1000 patterns are printed, these are measured and 256 patterns that will provide uniform gradation are selected from the 1000 patterns.

FIG. 18 is a specific example of the output density table 67 according to this embodiment.

The output density table 67 is created when the dot patterns of the representative colors have been determined by the operation described above.

First, patches based upon all output patterns are outputted by the printer and the colors of the patches are measured. In order to reduce printer variance and measurement error, the positions of the patches are changed, a plurality of patches are measured and the mean value is obtained.

Next, the mean measured value (X,Y,Z) obtained is converted to input color space (C,M,Y) in accordance with the following procedure:

(1) X,Y,Z→NTSC-RGB
R=(1.910X−0.532Y−0.288Z)/100
G=(−0.985X−1.999Y−0.028Z)/100
B=(0.058X−0.118Y−0.898Z)/100

(2) NTSC-RGB→RGB density (Dr,Dg,Db)
Dr=−$\log_{10}$(R)
Dg=−$\log_{10}$(G)
Db=−$\log_{10}$(B)

(3) Normalization
(Dmax: maximum density,
Dmin: minimum density)
C=($D_r$−$D_{min}$)×255/($D_{max}$−$D_{min}$)
M=($D_g$−$D_{min}$)×255/($D_{max}$−$D_{min}$)
Y=($D_b$−$D_{min}$)×255/($D_{max}$−$D_{min}$)

The measured color values resulting from the conversion are stored, as reproduction color data, at addresses indicated by the representative color codes of output density table 67.

In the method of conversion to input color space described above, a log function in used for the conversion to RGB density. However, this does not impose a limitation upon the invention, for the conversion may be made by using a LUT. Further, in a case where it is desired to shift the output color of the printer from the input color as in gamut compression, this can be implemented by applying a reverse correction to the values stored in the output density table 67. For example, in case of gamut compression, the value of the reproduction color data is shifted slightly toward the outside of the color reproduction range of the printer in such a manner that the reproduction color data will include the color reproduction range of the input color space. It should be noted that the reproduced colors C, M, Y of white (blank) are all 0.

FIG. 17 is a specific example of the code table 68 according to this embodiment.

The mapping of representative color codes in the code table 68 is performed using the distance to the measured color value as a reference. In other words, if C', M', Y' represent the color data (quantized representative values) at lattice points and C, M, Y represent the measured color values resulting from the above-mentioned conversion, the square $r^2$ of the distance is expressed as follows:

$$r^2=(C-C')^2+(M-M')^2+(Y-Y')^2$$

A representative color code for which the distance is minimized is stored at the relevant address of code table 68. In order to minimize quantization error, a quantized representative value (more specifically, a value weighted by the bits of the output of quantizer 66 plus one-half of the quantization step) is used instead of a value weighted by the bits of the color data at the lattice points. This is because the quantizer 66 extracts higher order bits (i.e., discards lower order bits). In a case where lower order bits are rounded off instead of being discarded, values obtained by making all lower order bits 0 may be used.

Instead of the square of distance mentioned above, the absolute value of a difference, for example, may be used an evaluation value for the purpose of mapping.

Further, quantized representative values are not limited to the central values of quantized values and it is permissible to shift them all or in part.

Though the input to the output density table 67 serves as the representative color code in the above embodiment, the CMY signals after quantization may be used as well. In this case, the code table 68 and output density table 67 are consolidated and the representative color code and output density value (reproduced color) are obtained by a single LUT search. This makes higher speed possible. In particular, if the representative color code is composed of eight bits, the output density value consists of 24 bits (8×3=24). As a result, the table has an output of 32 bits (8+24=32) and matching is excellent in an instance where the host employs 32 bits. In addition, a color shift outside color reproduction range of the printer can be prevented by correcting values and storing them in such a manner that color reproduction error will not accumulate with respect to inputs outside the color reproduction range of the printer.

The present invention can be applied to a system constituted by a plurality of devices, such as a host computer, interface and printer, or to an apparatus comprising a single device, such as a copier. Furthermore, it goes without saying that the invention is applicable also to a case where the object of the invention is attained by supplying a system or apparatus with a program that has been stored on a storage medium.

Thus, in accordance with the present invention as described above, there can be provided an image processing method and apparatus in which high-speed processing is possible as well as a limitation on the number of dots on dots.

As many apparently widely different embodiments of the present invention can be made without departing from the spirit and scope thereof, it is to be understood that the invention is not limited to the specific embodiments thereof except as defined in the appended claims.

What is claimed is:

1. An image processing method comprising:
an input step of entering input color data of a plurality of color components in input color space;
a step of producing limited data by limiting data, which comprises the data of the plurality of color components, to data that is expressed in the input color space;
a quantization step of quantizing the limited data of each of the plurality of color components to data having a level lower than an input level;
a generation step of generating output color data of a plurality of output color components, which is mapped into the input color space, by a table conversion, from the quantized data;
a step of obtaining color reproduction error between the input color data and the output color data by converting colors, which are expressed by the data of the plurality of output color components, to data in the input color space; and
a first error correction step of correcting the obtained color reproduction error,
wherein said step of obtaining color reproduction error includes obtaining the color reproduction error between the input color data and the output color data to correct a quantization error produced with the quantization in said quantization step and a conversion error generated by the table conversion.

2. The method according to claim 1, wherein said input step has a conversion step of entering luminance data of a plurality of color components and converting the entered luminance data of the plurality of color components to density data.

3. The method according to claim 2, further comprising a second error correction step of correcting an error produced at execution of conversion processing in said conversion step and quantization processing in said quantization step.

4. The method according to claim 3, wherein said first error correction step includes diffusing the error to the data that has been quantized in said quantization step, and said second error correction step includes diffusing the error to data in the input color space.

5. The method according to claim 4, further comprising a step of changing a scanning direction of the data, which have been quantized in said quantization step, in order to reverse a diffusion direction of the error in said first error correction step and said second error correction step.

6. The method according to claim 1, further comprising a step of correcting a reproduced color based upon a state of overlapping of dots formed by the output color-component data.

7. An image processing apparatus comprising:

input means for entering input color data of a plurality of color components in input color space;

means for producing limited data by limiting data, which comprises the data of the plurality of color components, to data that is expressed in the input color space;

quantizing means for quantizing the limited data of each of the plurality of color components to data having a level lower than an input level;

generating means for generating output color data of a plurality of output color components, which is mapped into the input color space, by a table conversion, from the quantized data of the plurality of color components;

means for obtaining color reproduction error between the input color data and the output color data by converting colors, which are expressed by the data of the plurality of output color components, to data in the input color space; and first error correction means for correcting the obtained color reproduction error, wherein said means for obtaining color reproduction error includes means for obtaining the color reproduction error between the input color data and the output color data to correct a quantization error produced with the quantization by said quantizing means and a conversion error generated by the table conversion.

8. The apparatus according to claim 7, wherein said input means has conversion means for entering luminance data of a plurality of color components and converting the entered luminance data of the plurality of color components to density data.

9. The apparatus according to claim 8, further comprising second error correction means for correcting an error produced at execution of conversion processing by said conversion means and quantization processing by said quantizing means.

10. The apparatus according to claim 9, wherein said first error correction means diffuses the error to the data that have been quantized by said quantizing means, and said second error correction means diffuses the error to data in input color space.

11. The apparatus according to claim 10, further comprising means for changing a scanning direction of the data, which have been quantized by said quantizing means, in order to reverse a diffusion direction of the error in said first error correction means and said second error correction means.

12. The apparatus according to claim 7, further comprising means for correcting a reproduced color based upon a state of overlapping of dots formed by the output color-component data.

* * * * *

UNITED STATES PATENT AND TRADEMARK OFFICE
CERTIFICATE OF CORRECTION

PATENT NO. : 6,330,075 B1
DATED : December 11, 2001
INVENTOR(S) : Ishikawa

It is certified that error appears in the above-identified patent and that said Letters Patent is hereby corrected as shown below:

Column 7,
Line 67, "signal" should read -- signals --.

Column 8,
Line 1, "density" should read -- luminance --; and
Line 15, "a" should be deleted.

Column 12,
Line 67, "processing 63," should read -- processor 63, --.

Column 14,
Line 23, "generated" should read -- generating --; and
Line 39, "will" should read -- will be --.

Column 15,
Line 23, "in" should read -- is --.

Signed and Sealed this

Tenth Day of September, 2002

*Attest:*

JAMES E. ROGAN
*Director of the United States Patent and Trademark Office*

*Attesting Officer*